Figure 5:
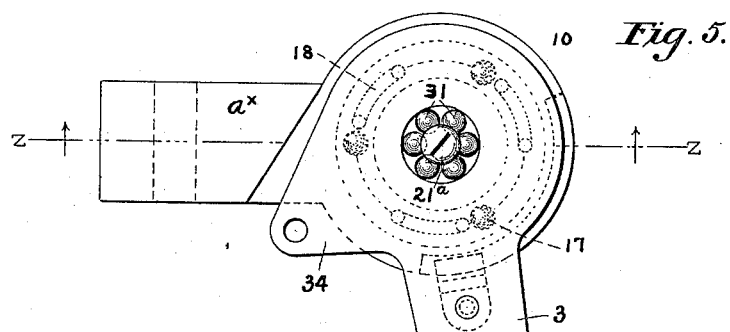

No. 652,063. Patented June 19, 1900.
G. B. WEBB.
TYPE WRITING MACHINE.
(Application filed Jan. 3, 1899.)
(No Model.) 2 Sheets—Sheet 1.
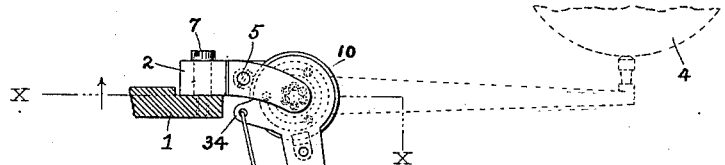
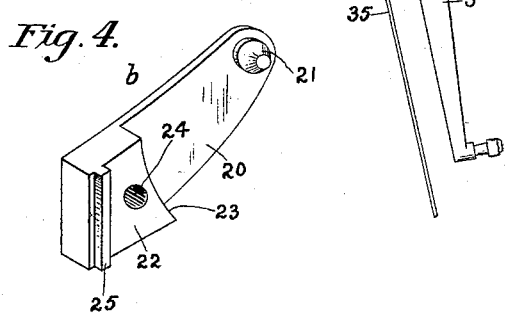
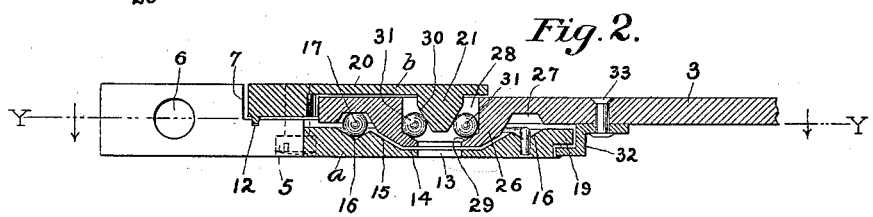
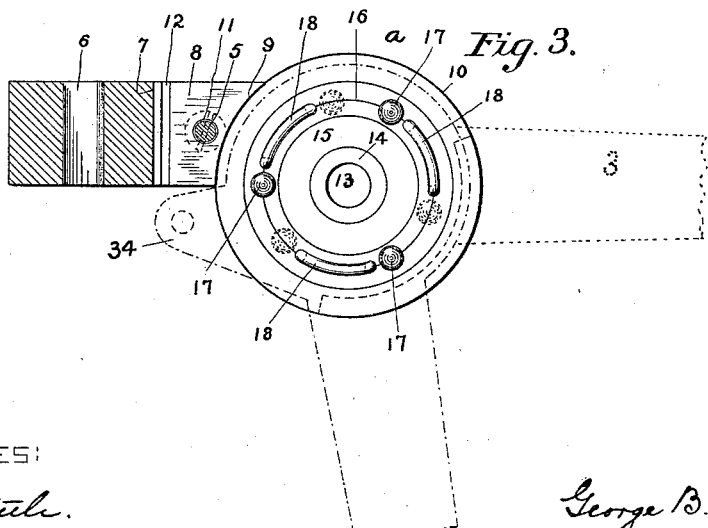
WITNESSES:
H. H. Steele.
K. V. Donovan.
INVENTOR
George B. Webb
by Jacob Felbel
HIS ATTORNEY No. 652,063. Patented June 19, 1900.
G. B. WEBB.
TYPE WRITING MACHINE.
(Application filed Jan. 3, 1899.)

(No Model.) 2 Sheets—Sheet 2.

WITNESSES:
H. H. Steele.
K. V. Donovan.

INVENTOR
George B. Webb
by Jacob Felbel
HIS ATTORNEY

UNITED STATES PATENT OFFICE.

GEORGE B. WEBB, OF WESTFIELD, NEW JERSEY, ASSIGNOR TO THE WYCKOFF, SEAMANS & BENEDICT, OF ILION, NEW YORK.

TYPE-WRITING MACHINE.

SPECIFICATION forming part of Letters Patent No. 652,063, dated June 19, 1900.

Application filed January 3, 1899. Serial No. 701,001. (No model.)

*To all whom it may concern:*

Be it known that I, GEORGE B. WEBB, a citizen of the United States, and a resident of Westfield, in the county of Union and State of New Jersey, have invented certain new and useful Improvements in Type-Writing Machines, of which the following is a specification.

The present invention relates, primarily, to type-bar bearings, and more especially those in which antifriction devices are employed for the purpose of reducing the friction to a minimum.

Heretofore when it has been desired to make a ball-bearing type-bar of little width and yet of sufficient steadiness for practical purposes two methods have been employed to secure the desired results. In one prior construction a flat type-bar is provided at its sides with circular grooves of equal diameters, and the inner sides of the hanger are provided with circular grooves of the same diameter and opposing the type-bar grooves, and there is a set of balls in each of the raceways formed by said opposing grooves. In the second prior method the type-bar hanger is provided with an external groove and the type-bar is provided with an internal groove, one set of balls only being used. In each case, however, it has been found that the bearing must be constructed with a very high degree of accuracy of fit in order, in the first instance, to secure the results sought, and, further, that the friction soon causes the bar to become loose, a slight amount of wear sufficing practically to destroy the usefulness of the bearing as a means for securing steadiness of the bar.

One object of the present invention is with a relatively-narrow type-bar bearing to secure the advantages of a relatively-long pivot or axis and so to avoid or minimize the bad effects of a given amount of wear, which is sufficient in the prior constructions practically to destroy the usefulness of the bearing as a means for securing steadiness of the bar as against endwise and sidewise motion thereof during operation. Other objects of the invention will hereinafter more fully appear.

To these ends the invention includes features of construction and combinations of devices hereinafter described, and more particularly pointed out in the appended claims.

The preferred form and several modifications of the invention are illustrated in the accompanying drawings, forming part of this specification, in which—

Figure 6:
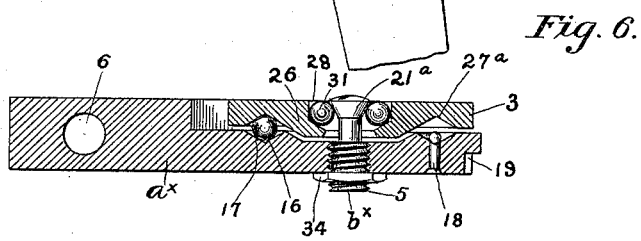
Figure 7:
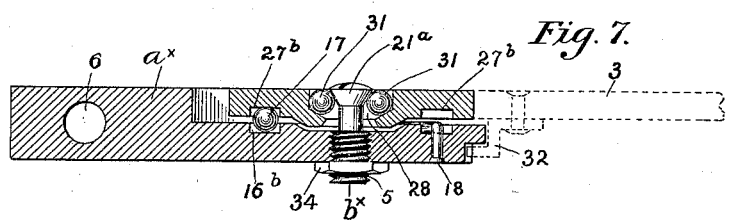
Figure 8:
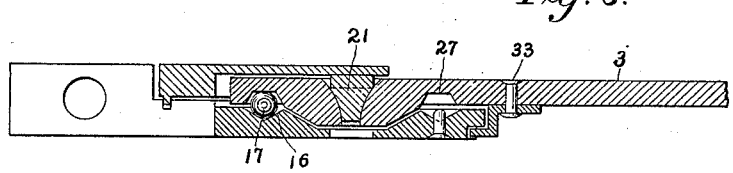

Figure 1 is a side elevation showing a type-bar hanger, a type-bar connected thereto, part of a top ring, part of a platen, and part of a connecting-rod. Fig. 2 is a view, partly in section, upon the plane indicated in Fig. 1 by the line X X and looking in the direction of the arrow thereat. Fig. 3 is a side view of the type-bar hanger, partly in section, upon the plane indicated in Fig. 2 by the line Y Y and looking in the direction of the arrows. Fig. 4 is a perspective view of a part of the type-bar hanger shown in Fig. 2. Fig. 5 is a side elevation of a modification of the bar. Fig. 6 is a view, partly in section, upon the plane indicated in Fig. 5 by the line Z Z and looking in the direction of the arrows. Fig. 7 is a view similar to Fig. 6 and showing a modification of certain parts. Fig. 8 is a view, partly in section, of another modification of the ball-bearing.

The same part will be found indicated in the various views of the drawings by the same numeral or letter of reference.

The form of the invention illustrated in Figs. 1 to 4, inclusive, will first be described. The reference-numeral 1 indicates part of a top plate or type-ring of any suitable form or construction; 2, a type-bar hanger; 3, a type-bar, and 4 a platen. The type-bar hanger 2 includes two arms or parts $a$ and $b$, which are held together by a screw 5. The arm $a$ consists of a block of metal provided with a vertical perforation 6 to receive a screw 7, by which the block is secured to the type-ring 1, the said screw engaging with a threaded hole in said ring. At a point intermediate the hole 6 and the axis of the type-bar the block $a$ is reduced or shouldered off at $7^a$ by about half its thickness, the said shoulder $7^a$ being substantially at right angles to the length of the block and also at right angles to the plane of the side thereof. The face 8 of the arm $a$, which is formed by the reduction of the thickness of the arm, as described, terminates in an arc-shaped shoulder or edge 9, that is concentric with and of the same radius as the circular end 10 of the arm $a$. The perforation 11 for the screw 5 passes through the said part 8 of the part $a$. This part 8 is also provided with a transverse groove 12, for a purpose presently to be described. The end 10 of the arm $a$ is provided with a perforation 13, and the metal of the arm is thinned down adjacent the perforation, as at 14, while exterior to the circular flat face 14 the metal is beveled, as at 15, and exterior to the flaring portion 15 is a circular V-shaped groove 16, forming a raceway for a set of balls 17. In order to reduce the number of balls to a minimum and to keep them separated or from bunching together, the metal of the part 10 is perforated at six points at the bottom of the groove 16, and U-shaped or staple-like separators 18 have their ends or legs inserted in said holes in the part 10 and are arc-shaped between said holes to fit the bottom of the groove 16. By preference there is sufficient friction between the legs of the separators and the holes in which they are inserted to retain the legs of the separators in position when once forced in. The above-described faces 14, 15, and 16 are on the inner side of the arm $a$. The outer peripheral edge of the part 10 is cut away or depressed to form a circular shoulder or ledge at 19, for a purpose presently to appear. The arm $b$ consists of a plate 20, provided near one end with a conical boss 21 and at its other end with a block 22, having an arc-shaped end 23 of substantially the same radius as the curved face 9 of the arm $a$ and constituting substantially a prolongation of the face 9. The block 22 and arm 20 are perforated at 24, and the perforation is threaded to receive the screw 5, hereinbefore mentioned. The inner face of the block 22 is provided with a vertical rib 25, adapted to fit the groove 12, hereinbefore mentioned. The parts are so proportioned that the axis of boss 21 coincides with the axis or center of the raceway 16. The type-bar 3 is provided with a boss 26, shaped exteriorly to lie within the conical cavity formed by the faces 14 15 of the arm $a$ and with a raceway 27 of substantially the radius of the raceway 16 and lying opposite the same when the parts are assembled. The type-bar is formed axially of the boss 26 with a cylindroconical perforation 28. The conical face 29 of the said perforation 28 is more flaring than the conical face 30 of the boss 21, the object being to provide a double bearing within the cavity in the boss 26 for a set of balls 31 lying in the space between boss 21 and the sides of the cylindroconical cavity in the boss 26. The type-bar 3 is provided with an overhanging Z-shaped arm 32, secured thereto by a rivet 33, the free end of the said arm overhanging the curved shoulder 19, hereinbefore mentioned, and very nearly touching the side of the same, so that any motion of the type-bar 3 in the direction of its axis of motion and away from the arm $a$ (upward in Fig. 2) would be arrested by the said arm 32 and flange or shoulder 19. The function of the coned bosses 21 and 26 and the balls 31 is to take the stresses incident to the motion of the type-bar about its axis, as in the printing-stroke, and to reduce the friction to a minimum, while the function of the set of balls 17, more distant from the center and having more travel, is, in conjunction with the inner bearing, to keep the bar from rocking sidewise or to steady the bar laterally and to conduce to its working in one plane. The arm 32 serves to prevent injury to the bar or bearings which might otherwise occur through accident or rough handling, as in cleaning the type. By preference the face of block 22 and the face 8 of arm $a$ are separated a small distance, whence it results that the arm $b$ may be drawn toward the arm $a$ by means of the screw 5 to nicely adjust the pressures between the working faces of the bosses and the raceways and the balls and to take up any wear that may occur, the rib 25 and the groove 12 furnishing a sort of guide and fulcrum for the arm $b$ in such adjustments. When the arms $a$ and $b$ are set originally, the pressure between cone 21 and balls 31 is equal to about one pound. It will thus be seen that my new ball-bearing for type-bars differs from the prior constructions in that the balls near the center, which have but little travel, take the stresses incident to the printing-strokes and that those balls more distant from the center and which have a greater distance to travel have no office to perform, except to keep the bar from rocking sidewise during such strokes, which they do in conjunction with the inner set of balls. Inasmuch as the outer balls have no side stress to resist they may be confined in flat and broad bottomed grooves, with little or no side friction, or, as is shown, one of the grooves may be slightly concave or V-shaped for the purpose of keeping the balls more accurately in position. The type-bar 3 is provided with a crank-arm 34, to which one end of a connecting-rod 35 is pivotally attached, the other end of the rod being suitably connected with a key or key-lever. (Not shown.)

The modification illustrated in Figs. 5 and 6 will next be described. In this modification the type-bar hanger comprises an arm $a^x$, perforated at 6 for the reception of the screw of the type or top ring. The circular end 10 is tapped axially for the reception of a screw-threaded shank or part $b^x$, provided with a conical end $21^a$, the device $b^x$ $21^a$ constituting, in effect, an arm opposing the arm $a^x$. The type-bar 3 is provided with a boss 26, having a cylindroconical portion 28, these parts being substantially as in the preceding case or as illustrated in Figs. 1 to 4; but the groove $27^a$ differs from the groove 27 in that it is V-shaped and not a broad flat-bottomed groove. The parts 16, 17, 18, and 31 are substantially the same as in the preceding case. The screw-threaded portion of the arm $b^\times$, which projects beyond the arm $a^\times$, may be provided with a lock-nut 34.

The modification shown in Fig. 7 differs from the modification shown in Figs. 5 and 6 mainly in the feature of constructing the grooves $27^b$ and $16^b$ so that they will be rectangular in cross-section, thus allowing the balls 17 to move more freely than in the preceding cases.

In the modification illustrated in Fig. 8 the conical boss 21 engages with a conical seat in the type-bar 3. In other respects this modification is or may be the same as the form illustrated in Figs. 1 to 4, inclusive.

It will be noted in all the forms of the invention illustrated in the drawings and hereinbefore described that a type-bar is provided with two bearings of unequal sizes or diameters and that said bearings are at opposite sides of the type-bar. Of course in so far as certain features of my invention are concerned the relative positions of the hanger (shown as the bifurcated member) and of the type-bar (shown as the single member) may be inverted without departing from the spirit of my broad invention. Some of the claims are to be read in the light of the facts just mentioned. It will also be noted that the two sets of balls shown in Fig. 2 are in one plane and that the two sets of balls shown in Figs. 6 and 7 are in each case substantially in the same plane, and in all three cases that these sets, being on opposite sides of the type-bar, oppose each other in the direction of the axis of motion of the type-bar, and that one set acts mainly as a pivot, while the other set acts only as a steadying device, although the two sets act together to effect the complete steadying of the type-bar against sidewise motion. The inner set of balls and the bearings therefor on hanger and type-bar serve to prevent endwise motion of the type-bar or motion of the type-bar across its axis of pivotal motion. By having two bearings of unequal diameters for the type-bar it is possible to bring the two into or substantially into one plane, thus reducing the width of the bearing to a minimum and reducing the effect of a given amount of wear upon the alinement—that is, one effect of two bearings of unequal diameters is that of a long bearing or axis of motion for the type-bar. Reducing the width of the bearing renders it possible, of course, to hang more type-bars in a circle of given diameter.

What I claim as new, and desire to secure by Letters Patent, is—

1. A type-bar ball-bearing having two sets of balls acting together to prevent lateral motion in both directions (or motion in the direction of the axis of pivotal motion of the type-bar) and one of said sets being adapted alone to prevent motion of the bar across the pivotal axis of said bar, and said set constituting the pivotal bearing of the bar.

2. A type-bar ball-bearing having two sets of balls in or substantially in the same plane, one set thereof being adapted to prevent motion of the bar across the pivotal axis of said bar and also constituting the pivotal bearing therefor, said set being arranged nearer the said axis of motion than the other set, and both sets acting together to prevent lateral motion or motion in the direction of the axis of pivotal motion of the bar.

3. A type-bar ball-bearing having two sets of balls opposing each other in the direction of the axis of pivotal motion of the bar, one of said sets alone being adapted to prevent motion of the bar across the pivotal axis thereof and also constituting the pivotal bearing of the bar.

4. A type-bar ball-bearing having two sets of balls arranged at different distances from the center of motion, one set alone being adapted to act as a pivotal bearing for the type-bar and being arranged near the center of motion, and the other set being placed farther from the said center and adapted to hold the pivotal set in position, and the two sets being adapted to hold the bar from sidewise motion.

5. A type-bar ball-bearing having two sets of balls, one of said sets alone being adapted to act as a pivotal bearing and being placed near the center of motion and the other set being placed in or nearly in the same plane as the first set but farther away from the said center and opposing the pivotal set, whereby the steadiness of the type-bar is maintained.

6. A type-bar ball-bearing having two sets of balls, one of said sets coacting with a conical boss and acting as a pivotal bearing and being placed near the center of motion and the other set being placed outside of and in or substantially in the same plane and opposing the said pivotal set, whereby the bar is steadied against sidewise and endwise motion.

7. The combination of a type-bar hanger, a type-bar pivotally connected therewith at one side of the bar to have a swinging motion on a horizontally-arranged axis, circular raceways on said bar and hanger exterior to and concentric with said pivot and at the opposite side of said bar, and balls in and coacting with said raceways, whereby the bar is steadied against sidewise motion in each direction and also against endwise motion.

8. The combination of a type-bar hanger and a type-bar, one of said parts having a cylindroconical bore, with a boss on the other of said parts projecting into said bore, balls between said boss and the walls of said bore, the walls of the bore, the boss and the balls aforesaid forming the sole pivotal connection between the bar and the hanger and preventing motion transversely of the axis of motion of the bar, and means at the other side of the part having the bore and exterior to and concentric with said bore for holding said balls in place whereby endwise motion and sidewise motion in both directions by said bar are prevented.

9. The combination of a type-bar hanger provided with a transverse-coned axis or boss, a type-bar provided with a cylindroconical ball-bearing, balls coacting with said coned axis or boss and said bearing, and a bearing between the bar and hanger exterior to and concentric with said boss and at the opposite side of said type-bar for holding said balls in place.

10. The combination of a type-bar hanger and a type-bar, one of said parts having a cylindroconical bore, with a boss or axis on the other of said parts and projecting into said bore, balls between said axis or boss and the walls of said bore, circular raceways on bar and hanger exterior to and concentric to said axis and at the opposite side of the part having the bore, and balls coacting with said raceways whereby the bar is steadied against sidewise motion.

11. The combination of a type-bar hanger provided with a transverse-coned axis or boss, a type-bar provided with a cylindroconical ball-bearing, balls coacting with said coned axis or boss and with said bearing, the boss, the bearing and the balls aforesaid constituting the sole pivot of the bar and alone preventing motion of the bar transversely of the axis of its motion, and a bearing between the hanger and the bar exterior to and concentric with said axis and at the opposite side of said bar, said pivotal bearing and said exterior bearing acting together to prevent the bar from moving laterally in either direction.

12. The combination of a type-bar hanger provided with a coned axis or boss, a type-bar provided with a ball-seat opposing said coned boss, a set of balls coacting with said cone and seat, the boss, the seat and the balls aforesaid constituting the sole pivot of the bar and preventing motion of the bar transversely of its axis of motion, raceways on said hanger and on said bar at the side of the bar away from said boss, and balls in said raceways opposing the first set of balls, whereby sidewise motion in each direction and endwise motion of said bar are prevented.

13. The combination of a type-bar hanger provided with a conical boss or axis, a type-bar provided with a cylindroconical ball-seat and surrounding said boss, balls coacting with said boss and seat to prevent motion of the bar transversely of its axis and acting as a pivot for the bar, raceways on said bar and hanger at the opposite side of said bar and farther from the center than the first said set of balls and a second set of balls placed in said raceways whereby side motion of said bar is prevented.

14. The combination of a type-bar hanger provided with a conical axis or boss, a type-bar provided with a boss having a cylindroconical bore surrounding said hanger-boss, a set of balls between said hanger-boss and the walls of the cylindroconical bore of the type-bar, circular raceways on bar and hanger exterior to and concentric with the pivot of the bar and at the side of the bar opposite the first set of balls, and a set of balls in said raceways and in or substantially in the plane of the first-named set of balls, and the whole adapted to prevent sidewise and endwise motion of the bar.

15. The combination of a type-bar hanger provided with a conical boss, a type-bar having a cylindroconical bore and arranged with the walls of said bore to oppose the coned boss, a set of balls intermediate said boss and the walls of said bore, circular raceways concentric with and farther from the center than said coned boss and at the opposite side of said type-bar, a set of balls in said raceways and coacting with the same to oppose the first set of balls and prevent sidewise motion of the bar, and fixed stops or separators in said raceways for separating the balls and limiting the motion thereof.

16. The combination of a two-part type-bar hanger, a screw for securing said parts together and one of said parts being provided with a conical boss, and the other of said parts being provided with a raceway exterior to and concentric with said boss, a type-bar provided with a cylindroconical bore adapted to surround said boss and provided with a raceway opposing that in the hanger, and sets of balls between the walls of said bore and said boss and in said raceways, said sets of balls being at opposite sides of said bar, whereby the inner set acts as a pivot and to prevent motion of the bar transversely of its axis and the two sets act to prevent sidewise motion of the bar.

17. The combination of a two-part type-bar hanger, a binding and adjusting screw for securing said parts together, a conical boss upon one of said parts having its smaller end toward the second of said parts, a raceway on the second of said parts and concentric with and exterior to said boss and opposing the first-named part, a type-bar provided with a transverse cylindroconical bore adapted to surround said boss, a set of balls coacting with said boss and the walls of said bore, said type-bar being provided with a raceway at the side thereof opposite the said boss and facing the raceway of the hanger, and a set of balls in said raceways opposing the first-named set and the two sets preventing side motion of the bar while the first-named set acts as a pivot and to prevent motion of the bar transversely of its axis.

18. The combination of a two-part type-bar hanger, a binding and adjusting screw for said parts, a conical boss on one of said parts with its smaller end toward the other or second part of the hanger, and said second part being coned out or reduced in thickness opposite and adjacent said boss, a flat type-bar provided with a boss having a cylindroconical bore concentric with its said boss, and its said boss being adapted to enter said bored-out portion of the hanger, a set of balls in said bore and coacting with said conical boss and the walls of said bore, a raceway on said second part of the hanger exterior to and on the same side thereof as the said bored-out or reduced portion, an opposing raceway on the bar exterior to its said boss and opposing the aforesaid raceway, and a set of balls in said raceways and in or substantially in the plane of the first-named set of balls and opposing the same, and the two sets preventing side motion of the bar.

19. The combination of a two-part type-bar hanger, a screw for binding together and adjusting said parts, a conical boss upon one of said parts with its smaller end toward the other of said parts, a type-bar pivotally connected on one side with said boss and provided at its opposite side with a raceway, a raceway on the second part of the hanger opposite that upon the type-bar and said raceways being concentric with said boss, and a set of balls in said raceways opposing the action of said conical boss and the two preventing side motion of the bar.

20. The combination of a two-part type-bar hanger, means for securing said parts together, a conical boss upon one of said parts arranged with its smaller end toward the other or second of said parts of the hanger, a type-bar connected at one side thereof with said boss and provided at its opposite side with a raceway concentric with said boss and exterior thereof, a raceway upon the second part of the hanger and facing or opposing the raceway on the bar, and a set of balls in said raceways and opposing the action of said boss and the two preventing side motion of the bar.

21. The combination of a type-bar hanger and a type-bar, one of said parts being bifurcated or provided with opposing parts and the other being single, with a bearing at each side of said single part, said bearings being of unequal radii and the inner bearing only acting to prevent motion of the bar transversely of the axis of motion thereof and both bearings acting to prevent side motion in either direction of said bar.

22. The combination of a type-bar hanger and a type-bar, one of said parts being bifurcated or provided with opposing parts and the other being single, with a ball-bearing at each side of said single part, said bearings being of unequal radii and one alone acting as a pivotal bearing and to prevent motion of the bar transversely of the axis of motion thereof, and both bearings acting to prevent side motion in either direction of said bar.

23. In a type-bar hanger, the combination of two separate arms, one arm being provided with a transverse groove and the other with a transverse rib to coact with said groove and said arms being provided with bearings for a type-bar, and a screw for adjustably securing said arms together, substantially as described.

24. The combination of two separate arms, one arm comprising an elongated plate provided on one side with a coned boss near one end and with a transversely-ribbed block at the other end, and the other arm comprising a transversely-grooved block to receive the ribbed portion of the first-named arm and a plate provided with a circular raceway concentric with said boss, a screw for adjustably securing said arms together, a bar provided with ball-seats at opposite sides thereof and opposing the said boss and the said raceway, and sets of balls coacting with the bar ball-seats and with the opposing cone and raceway.

25. The combination of a type-bar hanger comprising arms $a$ and $b$, the said arm $a$ comprising a shouldered block having a transverse groove 12 and a circular plate 10 provided with a circular grooved raceway 16 and a cupped portion inside the raceway, and the arm $b$ comprising a plate 20 provided with a coned boss 21 at near one end and with a block 22 on the same side of the plate as the boss and at the other end of the plate and a rib 25 on said block for coaction with the groove 12, a screw for adjustably securing the arms $a$ and $b$ together, a type-bar provided with a boss 26 at one side thereof and with a cylindroconical bore in said boss at the other side of the bar, a circular raceway outside the boss on the same side of the bar, a set of balls 17 in the groove 16 and bearing against the bar, a set of balls 31 between the boss 21 and the cylindroconical seat on the bar, and means for securing the hanger to a type-ring.

26. The combination of two separate arms, one arm being provided with a coned boss near one end and the other arm being provided with a circular plate opposite said boss and having a ball-trackway concentric with the boss, means for securing said arms together, a bar provided with ball-seats at opposite sides thereof, sets of balls coacting with the bar ball-seats and with the opposing cone and trackway on said arms, and an overhang on the bar adapted to coact with an outer face on said circular plate.

27. The combination of two separate arms one of said arms being provided with a conical boss near one end and the other arm being provided with a circular plate opposing said boss, the plate being provided on the inner side with a circular ball-trackway concentric with the boss, means for adjustably securing said arms together, a bar pivotally connected with said boss on one side of the bar and provided on the opposite side with a ball-raceway opposing that upon the circular plate, a set of balls in said raceways, and an overhang on the bar adapted to coact with an outer face of said circular plate.

28. The combination of a bar having bearings at opposite sides thereof of unequal radii, two arms adjustably connected together and provided with opposing pivotal bearings for coaction with the bar-bearings and one of said arms having a circular plate on which its said bearing is placed, and an overhang on the bar coacting with an outer face of said circular plate.

29. The combination of a bifurcated type-bar hanger, one of the arms thereof being provided with a conical boss and the other arm thereof being provided with a circular plate having a ball-raceway on the inner side thereof and exterior to and concentric with the said boss, a type-bar provided with a cylindroconical bore adapted to surround said boss and provided at the opposite side of the bar with a ball-track opposing that in the circular part of the hanger, sets of balls between the walls of said bore and said boss and in said raceways, whereby the inner set acts as a pivot, and an overhang on the bar adapted to coact with an exterior face of the said circular part of the hanger.

30. The combination of a hanger and a type-bar, one member thereof being provided with a transverse-coned axis or boss, the second member being provided with a cylindroconical ball-bearing, a set of balls coacting with said boss and said bearing, and a bearing between the second member and the first member exterior to and concentric with said boss and on the opposite side of said second member for holding said balls in place, the last-named bearing being on the inner side of a circular plate, and an overhang on the second member adapted to coact with an exterior face of said circular plate.

31. In a type-writing machine, the combination with a thin type-bar hanger having an enlarged hub or bearing portion, of a type-bar having a thin and enlarged hub portion parallel with that of the hanger, a pivot for the type-bar, a set of antifriction-balls therefor surrounding the pivot, bearings for said balls on both the hanger and the type-bar, and means for holding the two hub portions together and causing the balls to work properly on their bearings, the construction and arrangement being such that the pivotal portion of the type-bar prevents endwise movement of the type-bar and such that the enlarged hub portions with the antifriction-balls in their bearings are adapted to prevent sidewise movement of said type-bar.

Signed at the borough of Manhattan, in the city of New York, in the county of New York and State of New York, this 31st day of December, A. D. 1898.

GEORGE B. WEBB.

Witnesses:
PAUL ARMITAGE,
K. V. DONOVAN.